Sept. 28, 1965     A. WEHNER     3,208,594
SCREENING GRATE
Filed July 19, 1961     3 Sheets-Sheet 1
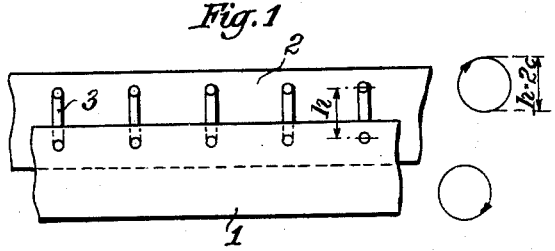
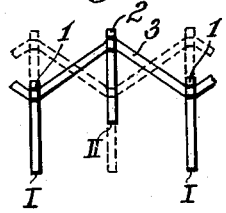
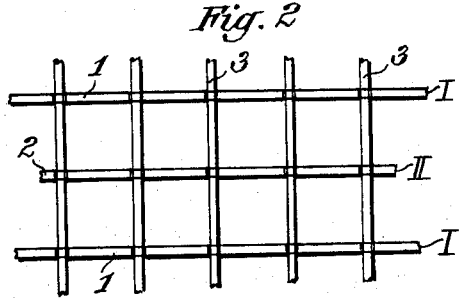
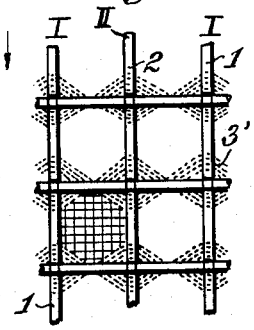
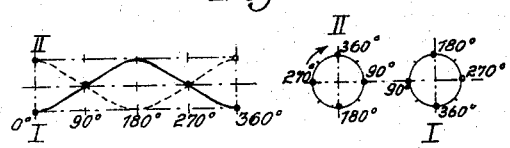
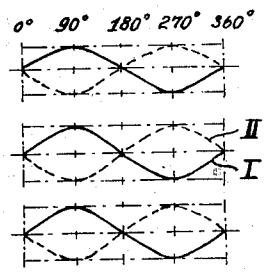
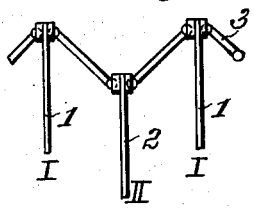
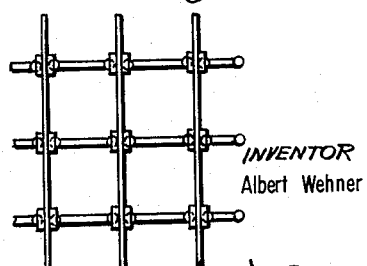
INVENTOR
Albert Wehner
BY *Malcolm W. Fraser*
ATTORNEY Sept. 28, 1965    A. WEHNER    3,208,594
SCREENING GRATE
Filed July 19, 1961    3 Sheets-Sheet 2
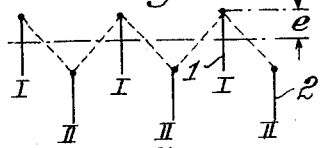
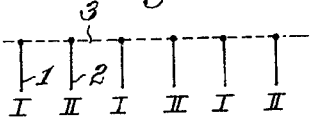
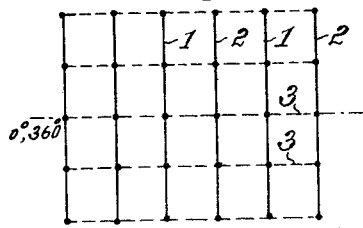
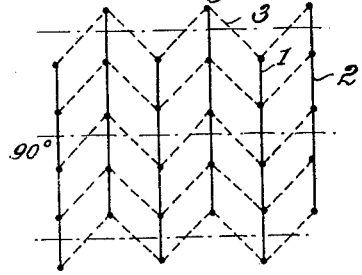
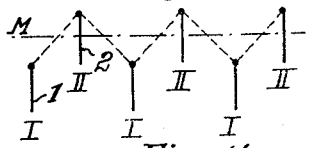
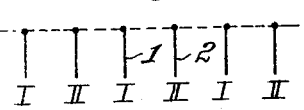
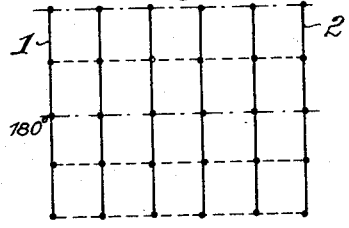
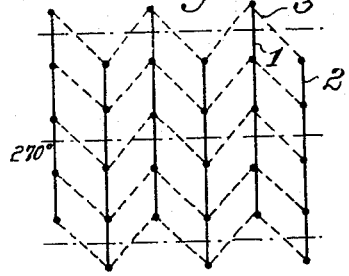
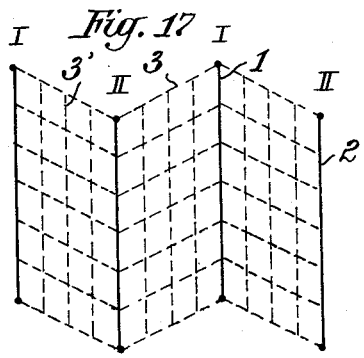
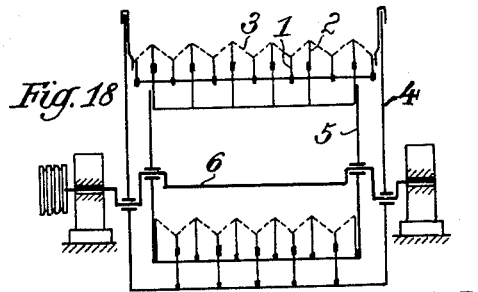
INVENTOR
ALBERT WEHNER
BY *Malcolm W. Fraser*
ATTORNEY

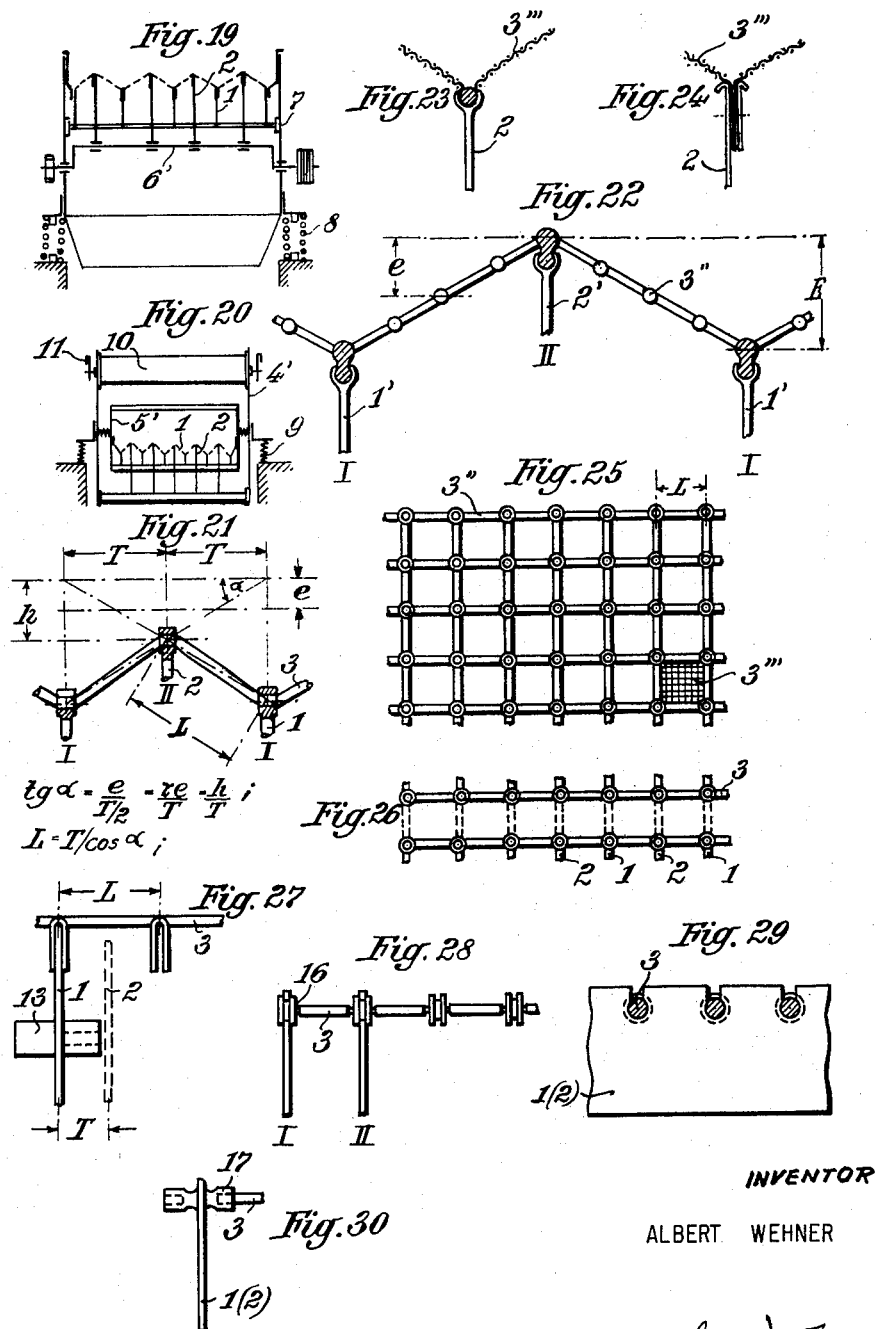

ID for the grate surface due
United States Patent Office 3,208,594
Patented Sept. 28, 1965

3,208,594
SCREENING GRATE
Albert Wehner, 70 Grunring, Herne,
Westphalia, Germany
Filed July 19, 1961, Ser. No. 125,273
Claims priority, application Germany, July 22, 1960,
W 28,222
7 Claims. (Cl. 209—379)

The invention relates to screening grates, basically for any desired applications but particularly suitable for screening out material which is difficult to screen, for example moist material and material generally which normally causes obstruction of the grate surface due to its properties, with any grain-size limits and, in fact, even with very small grain-size limits.

The invention starts from grates known per se consisting of bar elements allocated alternately to two systems at least one of which is driven.

In such grates the passage openings are formed between the bar elements which determine the grain-size limit in one direction, and it is known to limit the openings in the other direction by means of projections on the bar elements which extend transversely thereof.

According to the basic concept of the invention, instead of such an arrangement the bar elements belonging to adjacent different systems are connected to one another by transverse elements which are articulated or mounted on the bar elements for universal movement and in this way permit the necessary relative movement of the bar elements.

In this way, during relative movement of the two associated bar elements the transverse elements perform in turn movement dependent on the nature of the relative movement of the bar elements, i.e. the limits of the meshes formed by them are moved as they swing continuously about themselves. As a result all danger of obstruction is overcome.

This result is obtained in a particularly thorough manner if, according to a preferred embodiment of the invention, the transverse elements are longer than the lateral spacing of the bar elements and the moving grate system or systems are so driven, for example by means of a suitable eccentric drive, that the points of articulation of the transverse element on the bar elements execute circular movement.

With this preferred embodiment the transverse elements change their position continuously in both the horizontal and the vertical direction simultaneously. The transverse elements, according to whether only one of the systems is driven so that one of their pivot pins remains at rest or both systems are driven and both pivot points move so that a point in their middle region remains at rest, describe continuous closed paths according to the nature of the oscillation. In this movement the screening aperture defined by two immediately adjacent transverse elements in the longitudinal direction of the bar elements continuously changes its shape while, however, maintaining its cross-sectional area. The immediately adjacent transverse elements in the transverse direction may be in alignment with one another or relatively offset in the longitudinal direction.

It is particularly advantageous, if L is the length of the transverse elements which may be articulated at the upper edges or at equal vertical distances from the upper edges to the bar elements belonging to different adjacent systems, for the equation $$L = \frac{T}{\cos \alpha}$$

to be fulfilled, where T is the lateral distance of the bar elements from one another and $\alpha$ is the angle formed in the most extreme relative position thereof between the horizontal and the line connecting the two pivot points of a transverse element.

The basic concept of the invention set forth above may be carried into effect by employing rigid transverse elements which, for example, are mounted in ball-and-socket joint fashion on the bar elements. More advantageous, in particular with the aim of an even wider scope of the practicable application of the invention, is the non-rigid construction of the transverse elements. In this case they may consist, for example, of wires, cables or chains, or of cords which are elastic per se and made of rubber or else of a suitable plastic, for example on a polyamide basis. Particularly suitable are the plastics known by the trade name "Vulcollan" and based on ethylene glycol adipic acid polyester in combination with napththylene-1:5-diisocyanate.

The use of such materials for the transverse elements with a suitable construction such as is described in detail hereinafter enables supplementary oscillations to be superimposed on the movements of these elements. In particular, the use of these materials, with if desired larger spacings of the bar elements forming the grate, enables successive transverse elements to be connected with one another by means of continuous longitudinal filaments extending in the direction of the bar elements to form a screening surface of exactly defined mesh size which can be chosen as desired.

Also within the scope of the invention is a nontensioned but sagging arrangement of the transverse elements on the bar elements connected by them, and in such an arrangement the shape and size of the meshes changes continuously.

Furthermore, it is also possible, the entire grate being then fundamentally modified, to attach the bar elements of a system in self-supporting fashion to transverse elements which then connect two bar elements of one and the same system to one another, this system being advantageously held by resilient means connected to the frame of the other system, and in this way to make the second system oscillate. By means of a suitable drive for this system, for example by means of electric vibrators connected thereto, completely novel vibration effects can be obtained.

According to a special embodiment of the invention the transverse elements, which according to the practical arrangements which have been described so far are separate and spaced, can be replaced by continuous strips of wire mesh having a mesh size corresponding to the selected grain-size limit. If required, these strips can be combined with one another to form a whole which is then detachably fixed on the supporting base formed by the bar elements of the two systems.

The principle of the invention and a number of illustrative examples utilising the basic concept of the invention, but to which the invention is in no way limited, are illustrated in the accompanying drawings, in which:

FIGURE 1 is a side view of part of a screening grate according to a first embodiment of the invention, FIGURE 2 is a plan view thereof, FIGURES 3 and 4 show in side view and plan view the changes in the mesh boundaries in the case of an eccentric drive, as shown diagrammatically in FIGURE 1, FIGURES 5 and 6 show graphically the corresponding oscillation process, FIGURES 7 and 8 again show in side view and plan view the use of rigid transverse elements, FIGURES 9 to 16 show diagrammatically, in each case in side view and plan view, the position and shape of the meshes formed in different angular positions, FIGURE 17 shows in plan view a construction of the grate surface which is particularly suitable for grates having small separating apertures, FIGURES 18 to 20 illustrate, likewise in diagrammatic view, arrangements for driving the new screening grate, FIGURE 21 shows in side view the angular dependence when the system have an eccentric drive, FIGURES 22 to 30 show various possibilities of designing and inserting the transverse elements and of fixing them to the bar elements.

In FIGURES 1 to 4, the reference 1 designates the bar elements of one of the two grate system and the reference 2 the bar elements of the other of the two grate systems. In this case both systems are driven by eccentric drives shown only diagrammatically with a stroke of twice the eccentricity.

The two adjacent bar elements belonging to the different systems are connected to one another by transverse elements which, according to the embodiment, are elastic and extend through holes in all the grate elements from one side of the grate to the other or over sections thereof.

The movements which the transverse elements perform will in this case be clear without further explanation from a consideration of FIGURES 3 to 6. The sieve-like hatching at the bottom left in FIGURE 4 indicates the separating aperture, which as such always remains of constant area.

FIGURES 7 and 8 show how the transverse elements 3, which in this embodiment are rigid, are articulated for universal movement relatively to the bar elements 1 and 2 by means of ball-and-socket joints.

Of the diagramatic views of FIGURES 9 to 16, which show the position and the shape of the meshes formed in the stages between 0°, 90°, 180°, 270° and 360°, FIGURES 9 and 10 show the square shape of the meshes formed by the bar elements of the two systems which is obtained in the extreme upper position of one system I with respect to the other system II, i.e. at the vertical spacing of the upper edges which corresponds to twice the eccentricity. FIGURES 11 and 12, which correspond to a rotation through 90° show, as do the following FIGURES 13 and 14 and FIGURES 15 and 16, which respectively correspond to further rotations through angles of 90°, how in the course of the rotation the mesh boundaries change between square and rhombic form.

FIGURE 17 shows in plan view an arrangement of additional longitudinal wires or the like 3′ which extend in the longitudinal direction of the grate bars at equal spacings and by means of which the separating apertures are further divided.

FIGURES 18 to 20 do not require any detailed explanation. In the arrangement illustrated in FIGURE 18, the screen boxes 4 and 5 which are driven by a shaft 6 operate the grate bars 1, 2 in such manner that the course of movement illustrated in FIGURES 9 to 16 and described with reference thereto is obtained.

FIGURE 19 shows a drive arrangement in which the bar elements 2 of one system are driven directly by way of a crankshaft, whereas the bar elements 1 of the other system are connected to a screen box 7 mounted elastically on a bed. Thus the bar elements 2 move with a circular motion with respect to the bar elements 1, while the box 7 can perform an additional transporting movement as such under the action of a suitable drive, for example an out-of-balance eccentric.

FIGURE 20 shows a drive in which within the screen box 4′, which is operated by a motor 10 with out-of-balance discs 11 acting as a vibrator, there is elastically mounted a second screen box 5′. The grate bars 2 and 1 are respectively mounted in the two boxes and similarly perform movements of the type illustrated in FIGURES 9 and 10, in this case in a freely oscillating manner.

It is also possible to transmit movements of a different type to the grate bars 1 and 2, and in this way to obtain the result that the meshes defined by the transverse elements 3 and 3′ respectively are able to change their position and shape.

Likewise, known screening bottoms which have one or two moving grate systems can also be arranged according to the invention, so that the oscillations of the driving screening machine are then transmitted to the driven system with an increasing effect.

It will be seen from FIGURE 21 how the equation given at the beginning, namely $$L = \frac{T}{\cos \alpha}$$

is satisfied. The length L remains constant for the transverse elements 3, as in movement produced for example by eccentrics, and the angular conditions are indicated in that figure.

FIGURE 22 shows in side view, even more clearly than the embodiment illustrated diagrammatically in FIGURE 17, the subdivision of the meshes by means of intermediate wires or the like 3″ extending in the longitudinal direction of the bar elements. The offset arrangement of the transverse elements with respect to one another in successive rows is not shown in the drawings.

Instead of spaced transverse elements, FIGURES 23 and 24 show the possibility of connecting the adjacent bar elements 2 of different systems by means of continuous strips of wire mesh 3‴. The transverse wires of these mesh strips perform exactly the same movements as the transverse elements of the first embodiments, but with continuous folding of the entire surface of the strip by which the screening process is assisted and blockage is prevented, in particular with fine screening. This possibility is moreover illustrated diagrammatically in another constructional form at the bottom right in FIGURE 25.

In FIGURES 25 and 26 there can be seen a particularly advantageous arrangement in which the transverse elements are mounted on the bar elements. A net-like structure of intersecting filaments, for example rubber filaments, is mounted on the bar elements. The latter are provided with upwardly extending pegs and the net-like structure has at the points of intersection holes which fit over the projections of the bar elements.

FIGURE 26 shows the same method of fixing as is shown in FIGURE 25, applied to the fixing of elastic cords extending only in the transverse direction and constituting the transverse elements.

FIGURE 27 shows a method, similar in principle to the previous figures, of mounting a net-like elastic structure on the supporting base formed by the bar elements of the two systems by means of U-shaped mounting sections pushed on to the bar elements 1 and 2. According to this embodiment, a supporting projection 13 known per se is moreover arranged on one of the bar elements 1, the end face of this projection extending as far as the adjacent bar element 2 and sweeping flat over the latter.

FIGURES 28 and 29 show another method of fixing elastic transverse elements 3. In this case, slots are provided in the bar elements 1, 2 and into these slots the transverse elements 3 are inserted from above. The transverse elements 3 have at given intervals constrictions 16 which serve the purpose of improving the rotating capacity of the transverse elements in the region of the pivot points.

FIGURE 30 shows a particularly advantageous manner of mounting individual transverse elements in insertion sleeves 17 of elastic material fitted on the bar elements. These insertion sleeves take the place of the ball-and-socket joints of FIGURES 7 and 8 and permit the use of rigid transverse elements.

It will be appreciated that the invention is not limited to the embodiment described in detail above and illustrated in the accompanying drawings, but modifications thereof are possible without departing from the basic inventive concept.

I claim:

1. A screening grate comprising a first frame assembly and a second assembly, each of said frame assemblies including a plurality of substantially parallel spaced-apart grate bars, the spaced-apart grate bars of said first frame assembly interdigitated between and substantially coextensive with the spaced apart grate bars of said second frame assembly; a pluratlity of spaced transverse elements extending transversely of the grate bars and means pivotally interconnecting said elements to adjacent grate bars of said first frame assembly with adjacent grate bars of said second frame assembly, said elements effectively providing a screening area between the grate bars of said first and said second frame assemblies of a mesh-like configuration; and means for effecting relative rotational movement of said first frame assembly with respect to said second frame assembly whereby said transverse elements are caused to move universally between the pivotal connection of the adjacent grate bars to thereby continuously vary the shape of the mesh-like configuration of the screening area while maintaining the same effective overall screening area.

2. A screening grate according to claim 1 wherein said transverse elements are pivotally connected to said grate bars permitting relative movement of the grate bars of said first and said second frame assemblies in spaced vertical planes, each of said elements having a length L given by the equation $$L = \frac{T}{\cos \alpha}$$

where T is the lateral spacing of the grate bars and α the angle between the horizontal and the line connecting the two adjacent pivotal points of each transverse element in the extreme relative vertical position of said grate bars.

3. A screening grate according to claim 1 wherein said transverse elements are formed of elastic material.

4. A screening grate according to claim 1 further including a plurality of continuous longitudinal filaments extending generally parallel to said grate bars spaced therebetween and attached to said transverse elements to vary the mesh size of the screening grate.

5. A screening grate according to claim 1 wherein said transverse elements are in the form of adjacent strips of sieve netting extending across the entire area between adjacent grate bars, said strips interconnecting immediately adjacent pairs of said grate bars to divide up the gap therebetween.

6. A screening grate according to claim 1 wherein said transverse elements are rigid, and ball and socket means are provided for pivotally interconnecting the ends of said elements to adjacent ones of said grate bars.

7. A screening grate according to claim 5 wherein said strips are formed of elastic material and extend downwardly in folds over the top portion of the grate bars, and peg-like clamping means cooperating with said top portion of the grate bars to interconnect said strips to respective grate bars in the area of the folds.

References Cited by the Examiner

UNITED STATES PATENTS

| 674,286 | 5/01 | Stubbs | 209—310 |
|---|---|---|---|
| 975,437 | 11/10 | Kunkel | 74—600 |
| 2,665,631 | 1/54 | Paul | 74—599 |
| 2,790,552 | 4/57 | Symons | 209—395 |
| 2,837,210 | 6/58 | Ackert | 209—400 |
| 3,023,904 | 3/62 | Wehner | 209—396 |

FOREIGN PATENTS

| 134,970 | 2/80 | France. |
|---|---|---|
| 334,940 | 11/03 | France. |
| 454,308 | 4/13 | France. |
| 756,583 | 9/33 | France. |
| 1,207,304 | 8/59 | France. |

HARRY B. THORNTON, *Primary Examiner.*

HERBERT L. MARTIN, ROBERT A. O'LEARY,
*Examiners.*